United States Patent
Caley et al.

(10) Patent No.: US 8,880,713 B2
(45) Date of Patent: Nov. 4, 2014

(54) SYSTEM AND METHODS FOR USE IN COMMUNICATING WITH AN ENERGY MANAGEMENT DEVICE IN AN ENERGY DEVICE NETWORK

(75) Inventors: Myles Caley, Louisville, KY (US); Robert Marten Bultman, Louisville, KY (US); Natarajan Venkatakrishnan, Louisville, KY (US); Elmer Weston Brown, Cleveland, OH (US); William Anthony Watts, Louisville, KY (US); Edward Robert Melski, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 263 days.

(21) Appl. No.: 13/194,397

(22) Filed: Jul. 29, 2011

(65) Prior Publication Data

US 2013/0031617 A1    Jan. 31, 2013

(51) Int. Cl.
```
G06F 15/16    (2006.01)
H04L 12/28    (2006.01)
H04L 29/08    (2006.01)
H04L 12/24    (2006.01)
H04L 29/06    (2006.01)
```
(52) U.S. Cl.
CPC ............ *H04L 12/2809* (2013.01); *H04L 67/16* (2013.01); *H04L 41/12* (2013.01); *H04L 63/08* (2013.01)
USPC ........................................................ 709/229

(58) Field of Classification Search
CPC ....... H04L 9/32; H04L 12/2809; H04L 41/12; G06F 15/173; G06F 21/00
USPC ................... 709/229, 220, 224, 226
See application file for complete search history.

(56) References Cited

U.S. PATENT DOCUMENTS

| | | | |
|---|---|---|---|
| 6,636,983 B1 * | 10/2003 | Levi | 714/4.3 |
| 8,295,990 B2 | 10/2012 | Venkatakrishnan et al. | |
| 8,565,928 B2 | 10/2013 | Venkatakrishnan et al. | |
| 8,621,097 B2 | 12/2013 | Venkatakrishnan et al. | |
| 2003/0040897 A1 * | 2/2003 | Murphy et al. | 703/18 |
| 2005/0131583 A1 * | 6/2005 | Ransom | 700/295 |

(Continued)

FOREIGN PATENT DOCUMENTS

WO    20110133846 A1    10/2011

OTHER PUBLICATIONS

Wikipedia, The Free Encyclopedia, Zero configuration networking, May 14, 2011, 6 pages, Page Version ID: 438972114, Jul. 3, 2014.
U.S. Appl. No. 61/304,712, Jul. 3, 2014.
U.S. Appl. No. 12/983,425, Jul. 3, 2014.
U.S. Appl. No. 12/983,446, Jul. 3, 2014.
U.S. Appl. No. 12/983,471, Jul. 3, 2014.

(Continued)

*Primary Examiner* — Vivek Srivastava
*Assistant Examiner* — Normin Abedin
(74) *Attorney, Agent, or Firm* — Global Patent Operation; Marc A. Vivenzio (57) ABSTRACT

System, method, and computer-readable instructions for use in communicating with an energy management device in a network that comprises one or more energy devices. First search results are created by searching for devices associated with a first energy management device identifier using a first discovery protocol. Second search results are created by searching for devices associated with a second energy management device identifier using a second discovery protocol. The first and second search results are combined to create a collection of candidate devices, and at least one candidate device of the candidate devices is validated to determine whether the candidate device is an energy management device.

17 Claims, 3 Drawing Sheets

(56) References Cited

U.S. PATENT DOCUMENTS

| | | | |
|---|---|---|---|
| 2005/0177633 A1* | 8/2005 | Plunkett | 709/225 |
| 2008/0215727 A1* | 9/2008 | Denis et al. | 709/224 |
| 2010/0191555 A1 | 7/2010 | Shmul | |
| 2010/0306566 A1* | 12/2010 | Dehaan et al. | 713/330 |
| 2011/0202189 A1 | 8/2011 | Venkatakrishnan et al. | |
| 2011/0202190 A1 | 8/2011 | Venkatakrishnan et al. | |
| 2011/0202293 A1 | 8/2011 | Kobraei et al. | |
| 2011/0202783 A1 | 8/2011 | Venkatakrishnan et al. | |
| 2011/0264296 A1 | 10/2011 | Drake et al. | |
| 2012/0036245 A1* | 2/2012 | Dare et al. | 709/223 |

OTHER PUBLICATIONS

U.S. Appl. No. 12/983,488, Jul. 3, 2014.
U.S. Appl. No. 12/983,512, Jul. 3, 2014.
U.S. Appl. No. 12/983,533, Jul. 3, 2014.
U.S. Appl. No. 12/853,334, Jul. 3, 2014.
U.S. Appl. No. 61/326,948, Jul. 3, 2014.
U.S. Appl. No. 13/092,356, Jul. 3, 2014.
PCT Application Serial No. 2011/033550, Jul. 3, 2014.
Wikipedia, The Free Encyclopedia, Zero configuration networking, May 14, 2011, 6 pages, Version ID: 438972114, Jun. 27, 2014.

* cited by examiner

SYSTEM AND METHODS FOR USE IN COMMUNICATING WITH AN ENERGY MANAGEMENT DEVICE IN AN ENERGY DEVICE NETWORK

BACKGROUND OF THE INVENTION

The subject matter disclosed herein relates generally to energy device networks and, more specifically, to systems and methods for use in communicating with an energy management device in a network of energy devices.

At least some known energy devices are capable of exchanging information with other devices using a network. For example, an appliance may receive energy rate information from a utility provider system or transmit energy consumption information to a monitoring device.

Such information may be collected and processed by an energy management device, and reports describing overall and per-device energy consumption, for example, may be provided to a user. However, accessing energy information provided by an energy management device may require a user device to be manually configured, such as by entering a network address of the energy management device. This manual configuration may introduce delay, inconvenience, and/or a risk of data entry errors into the process of using the energy management device. Further, while an energy management device may be made discoverable by an automatic discovery protocol, a user device may be unable to discover the energy management device using such a protocol due to a lack of support for the protocol at the user device and/or a software conflict, such as security (e.g., firewall) software that prevents the user device from using such a protocol.

BRIEF DESCRIPTION OF THE INVENTION

In one aspect, a system is provided for use in communicating with an energy management device in a network that includes one or more energy devices. The system includes a communication interface configured to communicate with one or more energy devices, and a processor coupled to the communication interface. The processor is programmed to search, using the communication interface, for devices associated with a first energy management device identifier using a first discovery protocol to create first search results representing zero or more energy devices. The processor is also programmed to search, using the communication interface, for devices associated with a second energy management device identifier using a second discovery protocol to create second search results representing zero or more energy devices. The processor is further programmed to combine the first and second search results to create a collection of candidate devices, and to validate at least one candidate device of the candidate devices to determine whether the candidate device is an energy management device.

In another aspect, a method is provided for use in communicating with an energy management device in a network that includes one or more energy devices. The method includes searching for devices associated with a first energy management device identifier using a first discovery protocol to create first search results representing zero or more energy devices, and searching for devices associated with a second energy management device identifier using a second discovery protocol to create second search results representing zero or more energy devices. Searching for devices associated with the second energy management device identifier is performed concurrently with searching for devices associated with the first energy management device identifier. The first and second search results are combined to create a collection of candidate devices. At least one candidate device of the candidate devices is validated to determine whether the candidate device is an energy management device.

In yet another aspect, one or more non-transitory computer-readable storage media having computer-executable instructions embodied thereon are provided. When executed by at least one processor, the computer-executable instructions cause the processor to search for devices associated with a first energy management device identifier using a first discovery protocol to create first search results representing zero or more energy devices; to search for devices associated with a second energy management device identifier using a second discovery protocol to create second search results representing zero or more energy devices; to identify devices that are coupled to the network to create a collection of responding devices; to combine the first search results, the second search results, and at least a portion of the responding devices to create a collection of candidate devices; and to validate at least one candidate device of the candidate devices to determine whether the candidate device is an energy management device.

BRIEF DESCRIPTION OF THE DRAWINGS

FIGS. 1-3 show exemplary embodiments of the system and methods described herein.

DETAILED DESCRIPTION OF THE INVENTION

The embodiments described herein facilitate automatically identifying and communicating with an energy management device in a network that includes a plurality of energy devices. In exemplary embodiments, one or more searches for a predetermined identifier is/are performed using one or more automatic discovery protocols (e.g., zero configuration networking, or "zeroconf") that are executed by a computer processor. In addition, devices that are coupled to the network are identified and, optionally, filtered by a predetermined token (e.g., a manufacturer identifier in a hardware address). The results of these searches and the identified coupled devices are considered candidate devices.

A user device validates each candidate device to determine whether the candidate device is an energy management device until an energy management device is found, at which point the user device may begin communicating with the energy management device through a client connection. If the client connection becomes unavailable, the user device may repeat the process of identifying an energy management device.

Accordingly, embodiments provided herein enable a user device to quickly discover and communicate with an energy management device regardless of whether automatic discovery protocols are usable by the user device. Further, such embodiments enable the user device to automatically re-establish communication with an energy management device when such communication fails temporarily, and to automatically establish communication with a new energy management device if the energy management device is replaced.

Figure 1:
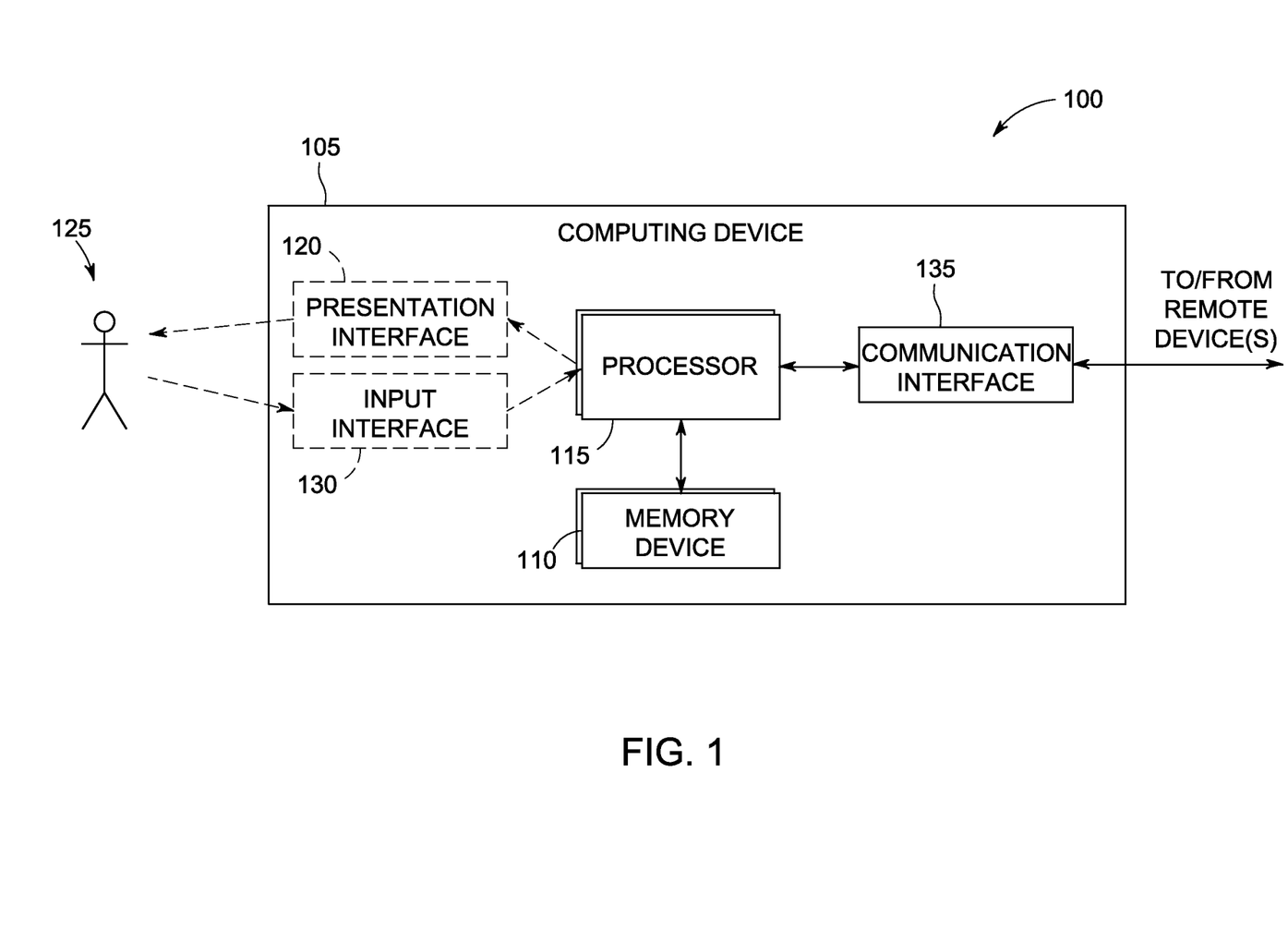
FIG. 1 is a block diagram of an exemplary computing device that may be used to communicate with an energy management device.

FIG. 1 is a block diagram of an exemplary system 100 with a computing device 105, such as a user device, an energy management device, and/or an energy service interface, that includes a memory device 110 and that may be used to communicate with an energy management device. Computing device 105 includes a processor 115 coupled to memory device 110 for executing programmed instructions. Processor 115 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. Processor 115 may include one or more processing units (e.g., in a multi-core configuration). The above examples are exemplary only, and thus are not intended to limit in any way the definition and/or meaning of the term processor.

Memory device 110 is one or more devices allowing information such as executable instructions and/or other data to be stored and retrieved. Memory device 110 may include one or more non-transitory computer readable media, such as, without limitation, dynamic random access memory (DRAM), static random access memory (SRAM), a solid state disk, and/or a hard disk. Memory device 110 may be configured to store, without limitation, executable instructions and/or any other type of data suitable for use with the methods described herein.

Computing device 105 is programmable to perform one or more operations described herein by programming processor 115. For example, processor 115 may be programmed by encoding an operation as one or more executable instructions and embodying the executable instructions in a non-transitory computer readable medium, including, without limitation, a storage device and/or a memory device (e.g., memory device 110). Such instructions, when executed by a processor, cause the processor to perform at least a portion of the methods described herein.

In the exemplary embodiment, computing device 105 includes a presentation interface 120 coupled to processor 115. Presentation interface 120 is configured to output (e.g., display, print, and/or otherwise output) information, such as, but not limited to, utility equipment information, available utility capacities, desired amounts of a utility, and/or fault conditions, to a user 125. For example, presentation interface 120 may include a display adapter (not shown in FIG. 1) that is coupled to a display device, such as a cathode ray tube (CRT), a liquid crystal display (LCD), an organic LED (OLED) display, and/or an "electronic ink" display. In some embodiments, presentation interface 120 includes more than one display device. In addition, or in the alternative, presentation interface 120 may include a printer.

In some embodiments, computing device 105 includes an input interface 130 that receives input from user 125. For example, input interface 130 may be configured to receive security credentials (e.g., an access code, a device name, a user name, and/or a password) and/or any other information suitable for use with the methods and systems described herein.

In exemplary embodiments, input interface 130 is coupled to processor 115 and may include, for example, a keyboard, a pointing device, a mouse, a stylus, a touch sensitive panel (e.g., a touch pad or a touch screen), an accelerometer, a position detector, and/or an audio input interface. A single component, such as a touch screen, may function as both a display device of presentation interface 120 and as input interface 130.

In exemplary embodiments, computing device 105 includes a communication interface 135 that is coupled to processor 115. Communication interface 135 is coupled in communication with a remote device, such as another computing device 105. For example, communication interface 135 may include, without limitation, a wired network adapter, a wireless network adapter, and/or a mobile telecommunications adapter.

In an exemplary embodiment, computing device 105 stores in memory device 110, and/or is operable to access using communication interface 135 (e.g., from another device similar to computing device 105), data for use in communicating with an energy management device. For example, such data may include security credentials, energy management device identifiers and/or tokens (e.g., names and/or numbers), manufacturer identifiers and/or tokens, identifiers and/or network addresses associated with computing devices, and/or any other data suitable for use with the methods described herein.

Figure 2:
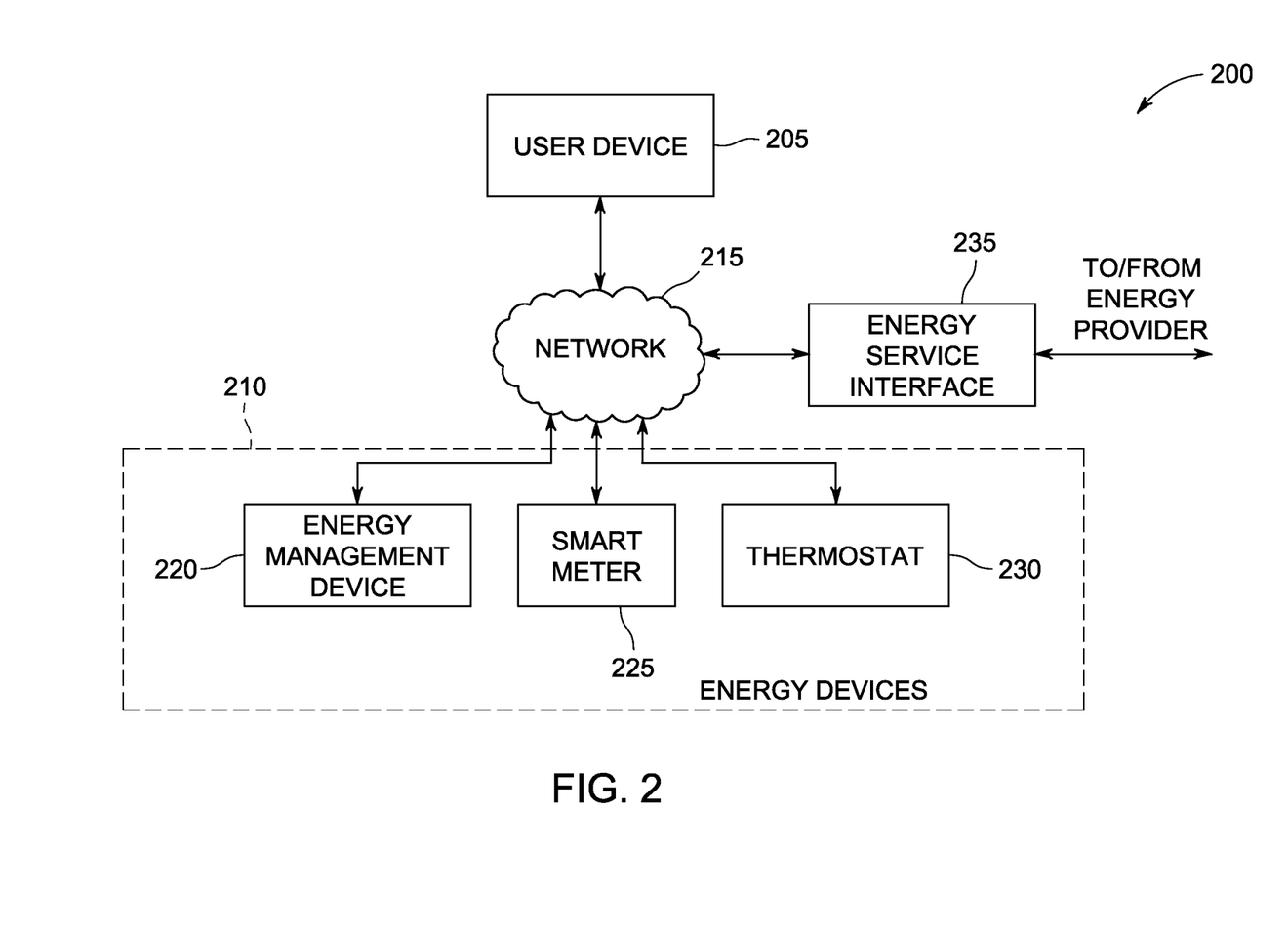
FIG. 2 is block diagram of an exemplary system that includes a user device coupled in communication with a plurality of energy devices by a network.

FIG. 2 is block diagram of an exemplary system 200 that includes a user device 205 coupled in communication with a plurality of energy devices 210 by a network 215. In exemplary embodiments, user device 205 and energy devices 210 are and/or include computing devices 105 (shown in FIG. 1) that are configured to communicate with each other using a communication interface 135 (shown in FIG. 1). While certain operations are described below with respect to particular devices, it is contemplated that any computing device 105 may perform any of the described operations. Network 215 may include, without limitation, a local area network (LAN), a wireless LAN (WLAN), a home area network (HAN), and/or a mesh network.

As shown in FIG. 2, energy devices 210 include an energy management device 220, a smart meter 225, and a thermostat 230. It is contemplated that system 200 may include any quantity of energy devices 210, such as appliances, climate control devices, lighting devices, and/or any other device capable of exchanging energy information (e.g., energy consumption information, energy rate information, and/or operating instructions) with other devices.

In exemplary embodiments, energy management device 220 transmits energy rate information (e.g., a current rate and/or a rate schedule) describing the unit cost of energy (e.g., as dollars per kilowatt-hour) to other energy devices 210, which may operate based at least in part on such energy rate information. For example, thermostat 230 may be programmed to curtail operation of a heating system when a current energy rate exceeds a predetermined threshold value. In some embodiments, energy management device 220 receives energy rate information from an energy service interface 235 that is coupled in communication with network 215 and with an energy provider system. Energy service interface 235 may be a discrete computing device 105 or, alternatively, may be integrated with another device, such as smart meter 225, energy management device 220, and/or user device 205.

In some embodiments, energy management device 220 transmits operating instructions to one or more other energy devices 210. For example, energy management device 220 may receive an operating parameter (e.g., a target temperature) from user device 205 and transmit an operating instruction indicating the operating parameter to thermostat 230.

Figure 3:
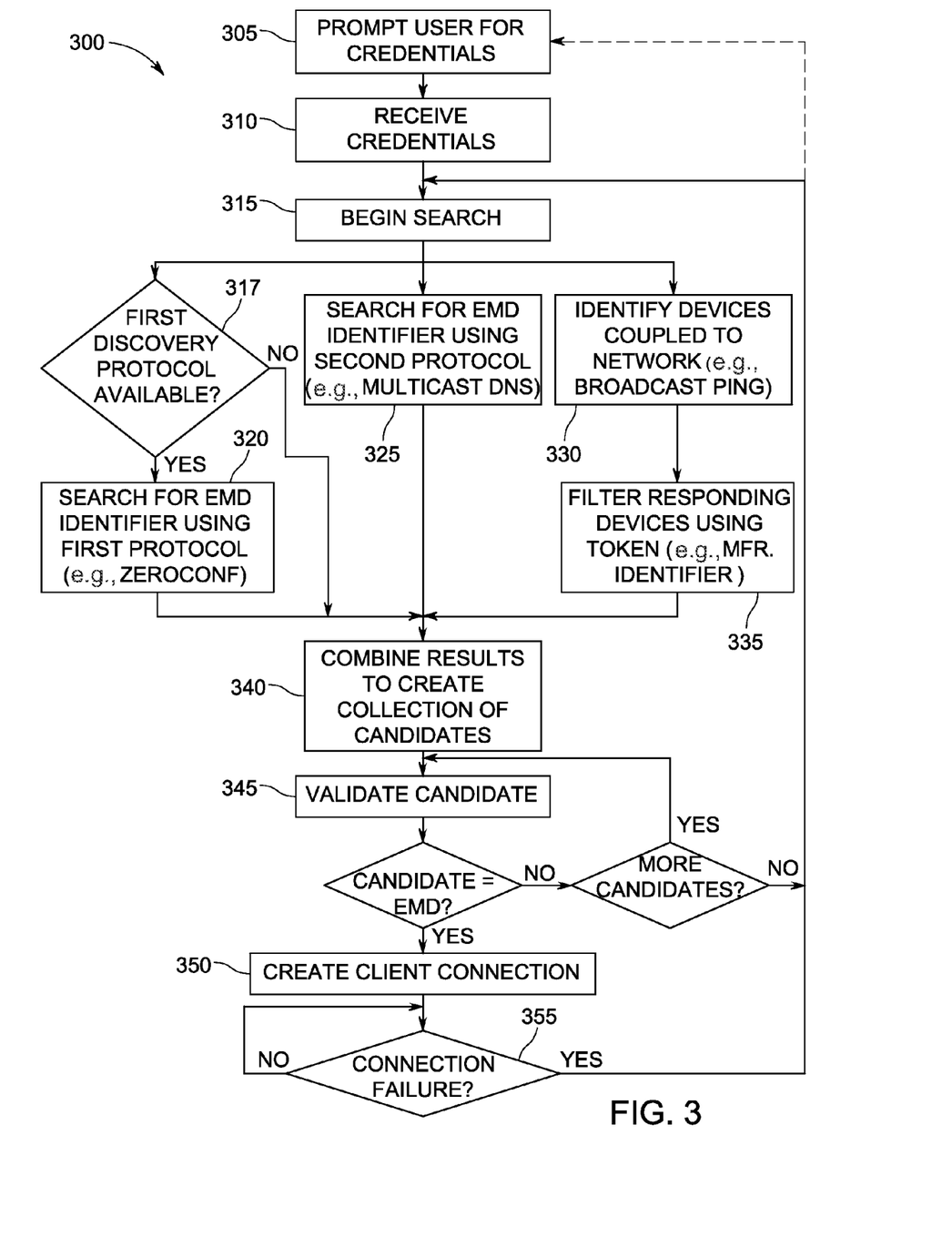
FIG. 3 is a flowchart of an exemplary method that may be used in communicating with the energy management device shown in FIG. 2.

FIG. 3 is a flowchart of an exemplary method 300 that may be used in communicating with energy management device 220 (shown in FIG. 2). As described below, method 300 is performed by user device 205 (shown in FIG. 2). In addition, or alternatively, method 300 may be performed by any computing device 105 (shown in FIG. 1).

In exemplary embodiments, to facilitate communication between user device 205 and energy management device 220, user device 205 prompts 305 the user to enter security credentials. Security credentials may include an access code (e.g., static or dynamically generated), a device name, a user name, a password, a biometric, and/or any other information suitable for authenticating the user.

User device 205 receives 310 the security credentials from the user. Referring also to FIG. 1, in exemplary embodiments, input interface 130 is configured to receive 310 the security credentials. In addition, or alternatively, any other device may be used to receive 310 security credentials. For example, security credentials may be received 310 using communication interface 135 and/or may be received 310 by retrieving the security credentials from memory device 110. Further, the security credentials may be stored in memory device 110 for subsequent use by user device 205.

User device 205 begins 315 a plurality of searches for energy management device 220. In exemplary embodiments, beginning 315 the search includes initiating a plurality of searches using communication interface 135, as described below. The searches may be executed in sequence or concurrently, and each search creates search results representing zero or more energy devices. In exemplary embodiments, user device 205 concurrently searches 320 for devices associated with an energy management device identifier using a first discovery protocol, searches 325 for devices associated with an energy management device identifier using a second discovery protocol, and identifies 330 devices that are coupled to network 215.

In some embodiments, user device 205 searches 320 using the first discovery protocol by invoking a search function provided by service discovery software executed by user device 205. For example, user device 205 may search 320 for a first energy management identifier, such as a name, using zero configuration networking, which is also referred to as "zeroconf." Executing the search 320 using the first discovery protocol, user device 205 transmits a request for computing devices 105 that are associated with the first energy management identifier and receives zero or more responses indicating such a computing device 105. In addition, or alternatively, user device 205 determines whether a list of computing devices 105 previously identified (e.g., devices from which a service advertisement was previously received) includes a computing device 105 associated with the first energy management device identifier. Computing devices 105 identified by searching 320 for the first energy management identifier are referred to herein as first search results.

In some embodiments, prior to attempting to search 320 using the first discovery protocol, user device 205 determines 317 whether the first discovery protocol is available for use, such as by determining whether service discovery software associated with the first discovery protocol (e.g., a software application implementing zeroconf) is installed and/or accessible at user device 205. If the first discovery protocol is not available, user device 205 omits searching 320 using the first discovery protocol.

User device 205 also searches 325 for devices associated with a second energy management device identifier (e.g., a host name), which may be different from the first energy management device identifier, using the second discovery protocol. In exemplary embodiments, user device 205 searches 325 for the second energy management device identifier at least in part by transmitting a multicast domain name service (mDNS) message using communication interface 135. The mDNS message represents a request for a network address associated with a computing device 105 that is associated with the second energy management device identifier. User device 205 receives zero or more responses indicating such a computing device 105. Computing devices 105 identified by searching 325 for the second energy management identifier are referred to herein as second search results.

User device 205 further identifies 330 computing devices 105 that are coupled to network 215 to create a collection of responding devices. In exemplary embodiments, user device 205 identifies 330 such computing devices 105 at least in part by transmitting a broadcast echo request, or "ping," message to network 215 using communication interface 135 and receiving one or more echo reply, or ping response, messages from network 215 using communication interface 135. For example, each computing device 105 that is coupled to network 215, other than user device 205, may transmit a ping response message to user device 205 and therefore be included in the collection of responding devices.

Compared to searching 320 for the first energy management device identifier and searching 325 for the second energy management device identifier, identifying 330 devices coupled to network 215 represents a relatively broad search for energy management device 220, as at least a portion of the responding devices may include energy devices 210 other than energy management device 220. Accordingly, in some embodiments, user device 205 filters 335 the collection of responding devices using a token that is representative of energy management device 220. In exemplary embodiments, user device 205 selects from the collection of responding devices one or more devices that are associated with a predetermined token and removes devices other than the selected devices from the collection of responding devices. For example, the collection may include a network address associated with each responding device, and user device 205 may select devices associated with a network address that includes a predetermined token. In exemplary embodiments, the network address is a hardware address, such as a media access control (MAC) address, that includes a manufacturer identifier. User device 205 selects devices associated with a manufacturer identifier corresponding to energy management device 220. In some embodiments, the manufacturer identifier associated with energy management device 220 differs from that associated with other energy devices 210, even if energy management device 220 is provided by the same entity that provides other energy devices 210. Such embodiments facilitate filtering 335 the collection of responding devices to include only computing devices 105 that are likely to be an energy management device 220.

User device 205 combines 340 the first search results, the second search results, and at least a portion of the responding devices (e.g., all devices in the filtered collection of responding devices) to create a collection of candidate devices. In some embodiments, user device 205 adds each device to the collection of candidate devices only if the device is not already included in the collection of candidate devices, such that no device appears in the collection more than once.

User device 205 validates 345 at least one candidate device of the candidate devices, such as the first candidate device in the collection of candidate devices, to determine whether the candidate device is an energy management device 220. In exemplary embodiments, user device 205 validates 345 a candidate device at least in part by attempting to create a client connection to the candidate device and determining whether the client connection was successfully created.

When the attempt to create the client connection is successful, the candidate device is determined to be an energy management device 220.

For example, user device 205 may attempt to create a client connection by submitting the security credentials previously received 310 by user device 205 to the candidate device for validation and determining whether the security credentials are successfully validated by the candidate device. User device 205 may further validate 345 the candidate device by attempting to execute one or more predetermined commands that are supported by energy management device 220 (e.g., a command for accessing energy information provided by energy management device 220) and determining whether the commands were successfully executed by the candidate device.

In exemplary embodiments, user device 205 validates 345 candidate devices in the collection of candidate devices until one of the candidate devices is determined to be an energy management device 220. For example, user device 205 may first validate 345 the first candidate device in the collection. When the first candidate device is not successfully validated 345, the first candidate device is determined to not be an energy management device 220, and user device 205 validates 345 second candidate device in the collection. In exemplary embodiments, such validation 345 may be performed by user device 205 until either 1) all candidate devices in the collection have been unsuccessfully validated 345, or 2) a candidate device is successfully validated 345.

When all candidate devices are unsuccessfully validated 345, user device 205 again begins 315 searching for an energy management device 220 using the security credentials previously received 310 or, optionally, prompting 305 the user for security credentials and receiving 310 the credentials. Allowing the user to re-enter the security credentials enables the user to correct erroneously entered security credentials and/or to update the security credentials for submission to a new energy management device 220.

When a candidate device is successfully validated 345, the candidate device is determined to be an energy management device 220, and user device 205 creates 350 a client connection to energy management device 220. In exemplary embodiments, user device 205 uses the client connection to communicate with (e.g., exchange energy information with) energy management device 220 until the client connection is no longer available due to an equipment failure, a power failure, electromagnetic interference, a restart of energy management device 220, a replacement of energy management device 220, and/or any other occurrence that may interrupt communication between user device 205 and energy management device 220 using the client connection.

When user device 205 determines 355 that no client connection to energy management device 220 is available, user device begins 315 searching for an energy management device 220 using the security credentials previously received 310 or, optionally, prompting for 305 and receiving 310 new security credentials, as described above.

Embodiments described herein may be performed using a computer-based or computing-device-based operating environment as described below. A computer or computing device may include one or more processors or processing units, system memory, and some form of non-transitory computer-readable media. Exemplary non-transitory computer-readable media include flash memory drives, hard disk drives, digital versatile discs (DVDs), compact discs (CDs), floppy disks, and tape cassettes. By way of example and not limitation, computer-readable media comprise computer storage media and communication media. Computer-readable storage media are non-transitory and store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when that general-purpose computer reads and/or executes the computer-readable instructions described herein.

The system and methods described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in terms of various specific embodiments, those skilled in the art will recognize that the invention may be practiced with modification within the spirit and scope of the claims.

What is claimed is:

1. A system for use in communicating with an energy management device in a network that includes one or more energy devices, said system comprising:
   a communication interface configured to communicate with one or more energy devices;
   a memory comprising computer readable instructions; and
   a processor coupled with said communication interface and said memory and configured to read and execute the computer-readable instructions, wherein when the computer-readable instructions are executed by the processor, the processor is programmed to:
      search, using said communication interface, for devices associated with a first energy management device identifier using a first discovery protocol to create first search results representing zero or more energy devices;
      search, using said communication interface, for devices associated with a second energy management device identifier using a second discovery protocol to create second search results representing zero or more energy devices wherein said processor is further programmed to search using the first discovery protocol concurrently with searching using the second discovery protocol;
      combine the first and second search results to create a collection of candidate devices;
      validate at least one candidate device of the collection of candidate devices to determine whether the candidate device is an energy management device, wherein said processor is programmed to attempt to validate the at least one candidate device at least in part by attempting to create a client connection to the candidate device; and
   an input interface coupled to said processor and configured to receive security credentials, wherein said processor is further programmed to attempt to create a client connection to the candidate device at least in part by:
      submitting the security credentials to the candidate device for validation; and
      determining whether the security credentials are successfully validated by the candidate device.

2. A system according to claim 1, wherein the at least one candidate device is a first candidate device, and when the first candidate device is determined to not be an energy management device, said processor is further programmed to validate a second candidate device of the candidate devices to determine whether the second candidate device is an energy management device.

3. A system according to claim 1, wherein searching for devices associated with the first energy management device identifier using the first discovery protocol comprises transmitting a multicast domain name service message using said communication interface.

4. A system according to claim 1, wherein said processor is further programmed to:
   identify devices that are coupled to the network to create a collection of responding devices; and
   include at least a portion of the responding devices in the collection of candidate devices.

5. A system according to claim 4, wherein said processor is programmed to:
   transmit a broadcast ping message using said communication interface; and
   receive one or more ping response messages using said communication interface to identify devices that are coupled to the network.

6. A system according to claim 5, wherein said processor is further programmed to:
   select from the collection of responding devices one or more devices that are associated with a predetermined manufacturer identifier; and
   include the selected devices in the collection of candidate devices.

7. A method for use in communicating with an energy management device in a network that includes one or more energy devices, said method comprising:
   searching for devices associated with a first energy management device identifier using a first discovery protocol to create first search results representing zero or more energy devices;
   searching for devices associated with a second energy management device identifier using a second discovery protocol to create second search results representing zero or more energy devices, wherein said searching for devices associated with the second energy management device identifier is performed concurrently with said searching for devices associated with the first energy management device identifier;
   combining the first and second search results to create a collection of candidate devices; and
   validating at least one candidate device of the collection of candidate devices to determine whether the candidate device is an energy management device, attempting to validate the at least one candidate device at least in part by attempting to create a client connection to the candidate device; and
   configuring an input interface to receive security credentials, wherein a client connection is attempted to the candidate device at least in part by:
   submitting the security credentials to the candidate device for validation; and
   determining whether the security credentials are successfully validated by the candidate device.

8. A method according to claim 7, wherein the at least one candidate device is a first candidate device, said method further comprising validating a second candidate device of the candidate devices to determine whether the second candidate device is an energy management device when the first candidate device is determined to not be an energy management device.

9. A method according to claim 7, wherein validating the at least one candidate device comprises attempting to create a client connection to the candidate device, wherein when said attempting is successful, the candidate device is determined to be an energy management device.

10. A method according to claim 7, further comprising performing said searching using the first discovery protocol and said searching using the second discovery protocol based on determining that no client connection to an energy management device is available.

11. A method according to claim 7, further comprising:
   identifying devices that are coupled to the network to create a collection of responding devices;
   selecting from the collection of responding devices one or more devices that are associated with a predetermined identifier; and
   including the selected devices in the collection of candidate devices.

12. One or more non-transitory computer-readable storage media having computer-executable instructions embodied thereon, wherein when executed by a processor, the computer-executable instructions cause the processor to:

search for devices associated with a first energy management device identifier using a first discovery protocol to create first search results representing zero or more energy devices;
search for devices associated with a second energy management device identifier using a second discovery protocol to create second search results representing zero or more energy devices wherein said processor is further programmed to search using the first discovery protocol concurrently with searching using the second discovery protocol;
identify devices that are coupled to the network to create a collection of responding devices;
combine the first search results, the second search results, and at least a portion of the responding devices to create a collection of candidate devices; and
validate at least one candidate device of the candidate devices to determine whether the candidate device is an energy management device wherein said processor is programmed to attempt to validate the at least one candidate device at least in part by attempting to create a client connection to the candidate device; and
an input interface coupled to said processor and configured to receive security credentials, wherein said processor is further programmed to attempt to create a client connection to the candidate device at least in part by:
submitting the security credentials to the candidate device for validation; and
determining whether the security credentials are successfully validated by the candidate device.

13. One or more non-transitory computer-readable storage media according to claim 12, wherein the computer-executable instructions cause the processor to:
transmit a broadcast ping message using said communication interface; and
receive one or more ping response messages using said communication interface to identify devices that are coupled to the network.

14. One or more non-transitory computer-readable storage media according to claim 12, wherein the computer-executable instructions further cause the processor to:
select from the collection of responding devices one or more devices that are associated with a hardware address that includes a predetermined token; and
include the selected devices in the collection of candidate devices.

15. One or more non-transitory computer-readable storage media according to claim 12, wherein the computer-executable instructions further cause the processor to concurrently search for devices associated with the first energy management device identifier, search for devices associated with the second energy management device identifier, and identify devices that are coupled to the network.

16. One or more non-transitory computer-readable storage media according to claim 12, wherein the computer-executable instructions further cause the processor to validate the at least one candidate device at least in part by attempting to create a client connection to the candidate device.

17. One or more non-transitory computer-readable storage media according to claim 12, wherein the computer-executable instructions further cause the processor to attempt to create a client connection to the candidate device at least in part by:
submitting security credentials received from a user to the candidate device for validation; and
determining whether the security credentials are successfully validated by the candidate device.

* * * * *